United States Patent [19]

Romein

[11] 4,246,439
[45] Jan. 20, 1981

[54] ACOUSTIC WRITING COMBINATION, COMPRISING A STYLUS WITH AN ASSOCIATED WRITING TABLET

[75] Inventor: Jacob J. Romein, Eindhoven, Netherlands

[73] Assignee: U.S. Philips Corporation, New York, N.Y.

[21] Appl. No.: 27,579

[22] Filed: Apr. 6, 1979

[30] Foreign Application Priority Data

Apr. 10, 1978 [NL] Netherlands ..................... 7803764

[51] Int. Cl.³ .............................................. G08C 21/00
[52] U.S. Cl. ..................................................... 178/18
[58] Field of Search .................... 178/18, 19; 367/129, 367/124; 33/1 P, 1 HH; 181/111; 343/112 PT; 340/16 R, 17 R, 15.5 TN; 346/139 C

[56] References Cited

U.S. PATENT DOCUMENTS

| 3,134,099 | 5/1964 | Woo .................................... 178/18 |
| 3,156,766 | 11/1964 | Stamps ................................ 178/18 |
| 3,731,273 | 5/1973 | Hunt ................................... 178/18 |
| 3,777,305 | 12/1973 | Stoutmeyer ........................ 367/129 |
| 3,838,212 | 9/1974 | Whetstone et al. ................ 178/18 |

Primary Examiner—Thomas A. Robinson
Attorney, Agent, or Firm—Thomas A. Briody; William J. Streeter; Bernard Franzblau

[57] ABSTRACT

An acoustic writing combination, includes a stylus with an associated writing tablet. The stylus is provided with two ultrasonic sound sources which upon contact of the stylus with the writing tablet emit pulse-shaped sound signals which are picked up by at least two microphones which are located at the edge of the writing tablet. The two sound sources are situated at different distances from the stylus tip and are operated to alternately produce ultrasonic signals. Point-shaped or circular sound sources may be employed. The circular sound sources may then comprise piezo-electric ceramic rings.

12 Claims, 4 Drawing Figures

ACOUSTIC WRITING COMBINATION, COMPRISING A STYLUS WITH AN ASSOCIATED WRITING TABLET

The invention relates to an acoustic writing combination comprising a stylus with an associated writing tablet. The stylus is provided with an ultrasonic sound source which emits pulse-shaped sound signals, which signals are picked up by at least two microphones which are arranged at the edge of the writing tablet.

Such a writing combination is known from the U.S. Pat. No. 3,838,212. The stylus used in this combination may comprise a crayon or pencil which is mounted in a holder containing a miniature loudspeaker.

Writing is done on a writing tablet which, if two microphones are employed, may comprise a blackboard or sheet of paper, or if three microphones are employed, a curved writing surface. In the case where two microphones are used they may be capacitive bar microphones which are arranged along the top edge and one of the side edges of the writing tablet, or they may be cylindrical microphones in the two upper corners of the writing tablet.

The miniature loudspeaker mainly emits pulse-shaped ultrasonic signals which are picked up by the microphones. By means of the delay of these signals, which delay depends on the distance from the stylus to each microphone, the positional coordinates of the stylus can be processed digitally. The picked-up and processed signals can be adapted to be transmitted over a telephone line or they may be stored in a record carrier.

The pulse train is emitted continuously, but only those movements are recorded which are performed on the writing tablet.

It has been found that the measured positional coordinates of this known writing combination do not actually correspond to those of the stylus tip. This is because it is not possible to provide said stylus tip with a sound source. As a result of this, tilting and turning of the stylus may give rise to deviations in the measured coordinates with respect to the tip of the stylus.

It is an object of the invention to eliminate this drawback and the invention is characterized in that the stylus is provided with two sound sources which are situated at different distances from the stylus tip, which sound sources alternately emit said sound signals.

By alternately measuring the positions of the two sound sources, the exact location of the stylus—i.e. the stylus tip—can be traced.

In one embodiment of the invention the sound sources are substantially point-shaped and are located in line with the stylus tip.

Each sound source then preferably comprises two electrodes between which a spark discharge is produced. The electrodes are located in a plastic block which also contains a piezo-electric ceramic insert which is disposed substantially opposite the location of the spark discharge.

The piezo-electric insert ensures that the spark remains very narrow and thus more closely approximates a point-shaped source. The insert also prevents an ignition delay of the spark.

For ease of deriving the coordinates of the stylus tip in the associated electrical processing circuits the distance between the sound sources and the distance of the lower sound source from the stylus tip are preferably substantially equal.

A different writing combination in accordance with the invention is characterized in that the sound sources are circular and essentially comprise piezo-electric ceramic rings whose inner and outer surfaces are provided with electrodes. In this case, it is then possible to connect the outer electrodes to ground so that the stylus can be used without risk.

The invention will be described in more detail with reference to the drawing in which.

Figure 1:
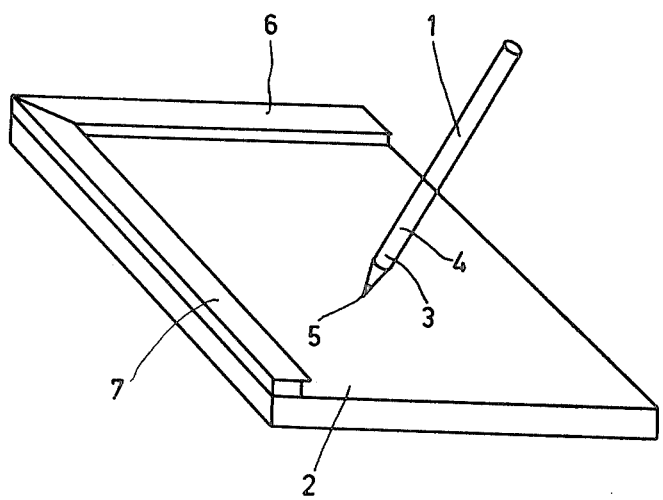
FIG. 1 shows an acoustic writing combination in accordance with the invention.

FIG. 1 shows an acoustic writing combination, a stylus 1—taking the form of a ballpoint pen—moving over a writing tablet 2. Said writing tablet may be a sheet of paper or a blackboard. In the last-mentioned case it is obvious that crayon is used which is inserted into an acoustic holder.

The stylus is provided with two point-shaped sound sources 3 and 4 which alternately emit a train of pulse-shaped ultrasonic signals. These signals are picked up by bar-shaped microphones 6 and 7 each extending along one of the side edges of the writing table 2, which edges are perpendicular to each other.

Figure 2:
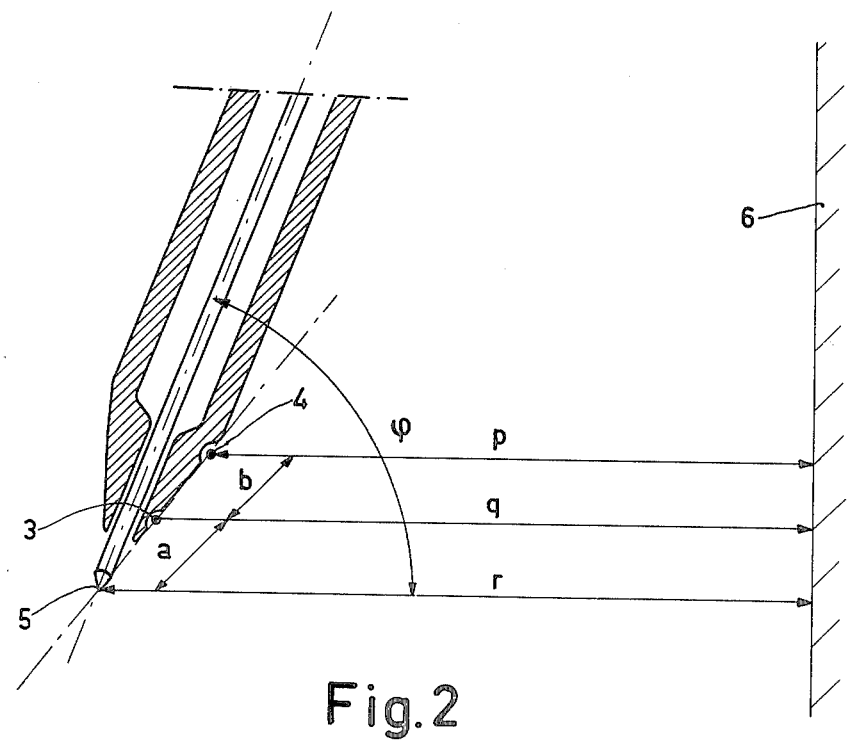
FIG. 2 is a cross-section of a stylus comprising two point-shaped sound sources, FIG. 3 schematically represents a point-shaped sound source, and FIG. 4 schematically represents an annular piezo-electric sound source.

FIG. 2 shows the stylus 1 in a longitudinal section. The sound sources 3 and 4, which are shown schematically, are disposed in line with the stylus tip 5.

One of the microphones, for example microphone 6, is arranged to the right of the stylus 1.

The distances of the sound sources 3 and 4 and the stylus tip 5 to each other and to the microphone 6 are designated a, b, p, q and r.

The pulse signals emitted by the sound sources 3 and 4 reach the microphones 6 and 7 respectively with a delay. Over a distance of 30 cm this delay is approximately 1 msec.

The delay is measured and the positional coordinates of the stylus can be derived from the delay times which have been measured.

In this respect it is of importance that the position of the stylus tip is determined exactly. This is effected by the use of two sound sources so that the orientation of the stylus, i.e. the angle $\phi$ with the writing tablet, does not lead to any deviation in the measured coordinates.

Expressed in the above-mentioned distances designated by letters, the distance from the stylus tip 5 to the bar microphone 6 is:

$$r = \frac{bq + a(q - p)}{b}$$

so that in the case of a=b:

$$r = 2q - p$$

which reveals that this function is independent of the angle $\varphi$.

As soon as the stylus tip 5 of the stylus is in contact with the paper or blackboard, i.e. the writing tablet, a micro-circuit is activated. This circuit activates a gate circuit in the electrical equipment in which the delay signals are processed digitally. The gate circuit then ensures that the graphic symbols are recorded.

Figure 3:
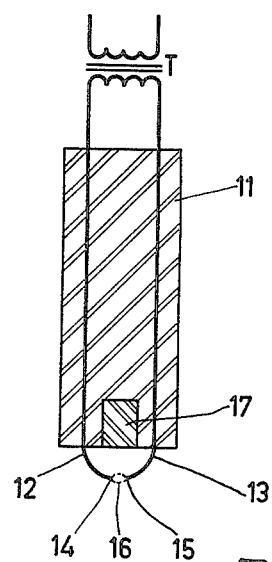

FIG. 3 schematically shows a point-shaped sound source. Essentially it comprises a plastic block 11, measuring 5×2×2 mm, which contains two electrodes 12 and 13. The ends 14 and 15 have been bent towards one another so that a very narrow gap of 0.1 mm is formed.

Via a transformer T with a winding ratio of 1:4, 500 V voltage pulses are transformed to 2000 V pulses and applied to the electrodes 12 and 13, each pulse producing a spark discharge 16 between the ends 14 and 15.

A piezo-electric ceramic insert 17 will contract and expand as a result of the electric field between the electrode terminals 14 and 15 produced by the voltage applied to the electrodes 12 and 13. A contraction of the piezoceramic insert causes a decrease in the air density between the electrode terminals which results in an easier ionization of the air, especially between said terminals. In this way the spark discharge can be better located between the two electrode terminals to produce a narrow spark discharge. This ensures that the spark discharge 16 remains very narrow and thus more or less represents a point-shaped sound source.

Figure 4:
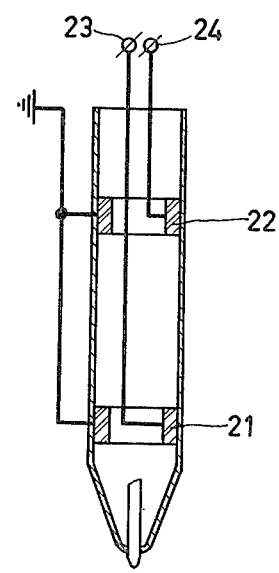

In FIG. 4 the stylus contains two sound sources aligned with the tip and in the form of piezo-electric ceramic rings 21 and 22 each having an electrode both on their inner and outer surfaces.

The outer electrodes are connected to ground and the inner electrodes are connected to an electronic power supply circuit via separate terminals 23 and 24, respectively.

What is claimed is:

1. An acoustic writing combination comprising, a writing tablet, a stylus movable about a surface of said tablet and provided with first and second ultrasonic sound sources situated on the stylus at different distances from the stylus tip, at least two microphones located at an edge of the writing tablet for receiving sound signals emitted by said first and second sound sources, and means for operating the sound sources to alternately emit pulsatory ultrasonic sound signals.

2. An acoustic writing combination as claimed in claim 1 wherein the first and second sound sources are substantially point-shaped and are located in a straight line with the stylus tip.

3. An acoustic writing combination as claimed in claim 2 wherein each sound source comprises two electrodes adapted to be coupled to a source of voltage and having confronting terminals forming an air gap and between which a spark discharge is produced, said electrodes being located in a plastic block which contains a piezo-electric ceramic insert disposed substantially opposite the location of the spark discharge.

4. An acoustic writing combination as claimed in claim 2 or 3 wherein the distance between the first and second sound sources is substantially equal to the distance between the sound source closest to the stylus tip and the stylus tip.

5. An acoustic writing combination as claimed in claim 1 wherein the sound sources are each circular and comprise first and second piezo-electric ceramic rings having inner and outer surfaces provided with electrodes.

6. An acoustic position indicator for determining the coordinate positions of a writing stylus over the surface of a writing tablet comprising, a writing tablet having first and second orthogonally extending edges and a surface data area, a stylus having a tip at one end adapted for movement adjacent to said surface of the tablet and provided with first and second ultrasonic sound sources each situated on the stylus spaced from and at a different distance from the stylus tip, first and second microphones located along said first and second edges of the tablet for receiving sound signals emitted by said first and second sound sources, and means for operating the sound sources to alternately emit pulsatory ultrasonic sound signals whereby the position of the stylus tip over the tablet data surface can be determined independent of the angle of tilt of the stylus.

7. An acoustic position indicator as claimed in claim 6 wherein the first and second sound sources are substantially point shaped and located along a straight line formed with the stylus tip.

8. An acoustic position indicator as claimed in claim 6 or 7 wherein the distance of the stylus tip to at least one of said microphones is given by the expression:

$$r = \frac{bq + a(q - p)}{b}$$

where:
r=distance between stylus tip and said one microphone
a=distance between stylus tip and said first sound source
b=distance between first and second sound sources
q=distance between first sound source and said one microphone
p=distance between second sound source and said one microphone.

9. An acoustic position indicator as claimed in claim 9 wherein a=b so that r=2q−p.

10. An acoustic position indicator as claimed in claim 6 or 7 wherein the first sound source is located intermediate the stylus tip and the second sound source and the distance between the first and second sound sources is substantially equal to the distance between the first sound source and the stylus tip.

11. An acoustic position indicator as claimed in claim 6 or 7 wherein each sound source comprises first and second elongate electrodes supported within a plastic block and having end terminals extending therefrom in confronting relationship to form an air gap to produce a spark discharge, said plastic block including a piezoelectric ceramic member disposed adjacent the air gap so that its dimensions vary in response to an electric field produced by a voltage applied to said electrodes.

12. An acoustic position indicator as claimed in claim 6 wherein said first and second sound sources comprise first and second axially spaced piezoelectric ceramic rings axially aligned with the stylus tip and having inner and outer surfaces provided with electrodes for connection to a source of voltage.

* * * * *